United States Patent
Hill

(10) Patent No.: US 6,533,005 B2
(45) Date of Patent: Mar. 18, 2003

(54) METHOD OF MAKING A HYBRID WOOD PRODUCT

(76) Inventor: David A. Hill, 2868 NW. Polarstar, Bend, OR (US) 97701

( * ) Notice: Subject to any disclaimer, the term of this patent is extended or adjusted under 35 U.S.C. 154(b) by 52 days.

(21) Appl. No.: 09/772,454

(22) Filed: Jan. 29, 2001

(65) Prior Publication Data

US 2001/0032683 A1 Oct. 25, 2001

Related U.S. Application Data

(60) Provisional application No. 60/179,809, filed on Feb. 2, 2000.

(51) Int. Cl.[7] ............................................. B27G 11/00
(52) U.S. Cl. .................... 144/350; 52/586; 144/347; 144/353; 156/304.3; 428/106; 428/119
(58) Field of Search .................... 144/345, 346, 144/350, 353, 347; 52/586; 156/304.1, 304.2, 304.3, 304.5; 428/114, 192, 106, 110, 119

(56) References Cited

U.S. PATENT DOCUMENTS

| | | | | |
|---|---|---|---|---|
| 732,741 A | * | 7/1903 | Heaton | 144/353 |
| 5,109,898 A | * | 5/1992 | Schact | 144/350 |
| 5,125,442 A | * | 6/1992 | Hendrickson | 144/353 |
| 6,374,880 B2 | * | 4/2002 | Macpherson et al. | 144/350 |

* cited by examiner

Primary Examiner—W. Donald Bray
(74) Attorney, Agent, or Firm—Kolisch, Hartwell, P.C.

(57) ABSTRACT

The invention provides a method of making a hybrid wood product that includes a void-free contact surface for abutment to another surface, for example a glass sheet. First, composite wood products are laminated to, and encompass, a solid-sawn lumber key. After cutting through the key and composite wood products, the resulting segments are milled to produce a hybrid wood product with a residual key contributing the void-free surface.

20 Claims, 2 Drawing Sheets

METHOD OF MAKING A HYBRID WOOD PRODUCT

CROSS-REFERENCES TO RELATED APPLICATIONS

This application claims priority to Provisional Application Serial No. 60/179,809 filed Feb. 2, 2000 entitled "Method of Making a Wood Product" which is hereby incorporated by reference.

FIELD OF THE INVENTION

The invention relates to a method of making a hybrid wood product that includes a void-free contact surface.

BACKGROUND OF THE INVENTION

The depletion of old-growth forests, coupled with an increasing demand for wood-based building materials, has pushed the lumber industry to seek more efficient methods to use available wood resources. To minimize the requirement for larger, older trees and to create optimal use of all available wood, wood-products manufacturers have developed composite wood products that fuse smaller pieces of wood. These products lessen the requirement for single-component, solid sawn lumber, and rely on smaller pieces of wood, wood scraps, or lumber processing by-products. For example, particle board is created by cementing small wood chips or fragments together into a composite, whereas fibre board relies on randomly oriented individual wood fibers, which are glued together.

One of the most effective load bearing composites is laminated veneer lumber, or LVL. LVL is produced from thin sheets of wood, which are affixed face to face to create a multi-layered wood product with a common grain orientation. Relatively short pieces of wood can be finger-jointed at their ends to create an elongate, quite strong, composite wood product capable of withstanding significant forces exerted orthogonal to the main axis. Since LVL is multi-layered, localized flaws and weak points in individual layers are distributed randomly. Therefore, LVL has significant structural advantages over a solid sawn, single-component piece of lumber in which structural weaknesses are more likely to be locally distributed across the entire width.

Despite the improved structural properties of LVL and its efficient use of smaller trees, LVL produces a surface inferior to single-component lumber when milled to create a framing component of a structure. The junction between individual layers of LVL, and the layers themselves often include imperfections or voids in any surface created as a result of lamination or from further shaping of the LVL product, such as during milling. These voids disrupt the uniformity of the LVL surface and destroy the ability of LVL to provide a tight, efficient contact junction for joining with another complementary surface, such as contributed by a pane of glass. This tight junction is important to minimize airflow and water leakage through the window frame. Therefore, LVL and other composite wood products are generally unsatisfactory components of a window frame relative to solid sawn lumber.

An object of the invention is to produce a hybrid wood product that maintains the benefits of using composite wood but includes a void-free surface contributed by solid sawn lumber.

A further object of the invention is to provide a method for producing a hybrid wood product with a void-free surface.

SUMMARY OF THE INVENTION

The invention provides a hybrid wood product with a void-free surface. The invention further provides a method of making a hybrid wood product with a void-free surface. The hybrid wood product is constructed in several steps. First, a hybrid wood material is produced by laminating a solid sawn lumber key in aligned furrows created in composite wood products. Then this hybrid wood material is cut through both the key and surrounding composite wood layers to create two or more segments that can be further milled or otherwise shaped. The resulting hybrid wood products include a void-free abutment surface formed by a residual portion of the key.

DETAILED DESCRIPTION

The objects of the invention may be achieved by providing a hybrid wood material such as the embodiment depicted in the Figures and identified generally with the numeral 10. The depicted hybrid wood material 10 is cut and milled to produce a plurality of hybrid wood products, which can function as frame components with void-free abutment surfaces.

Figure 1:
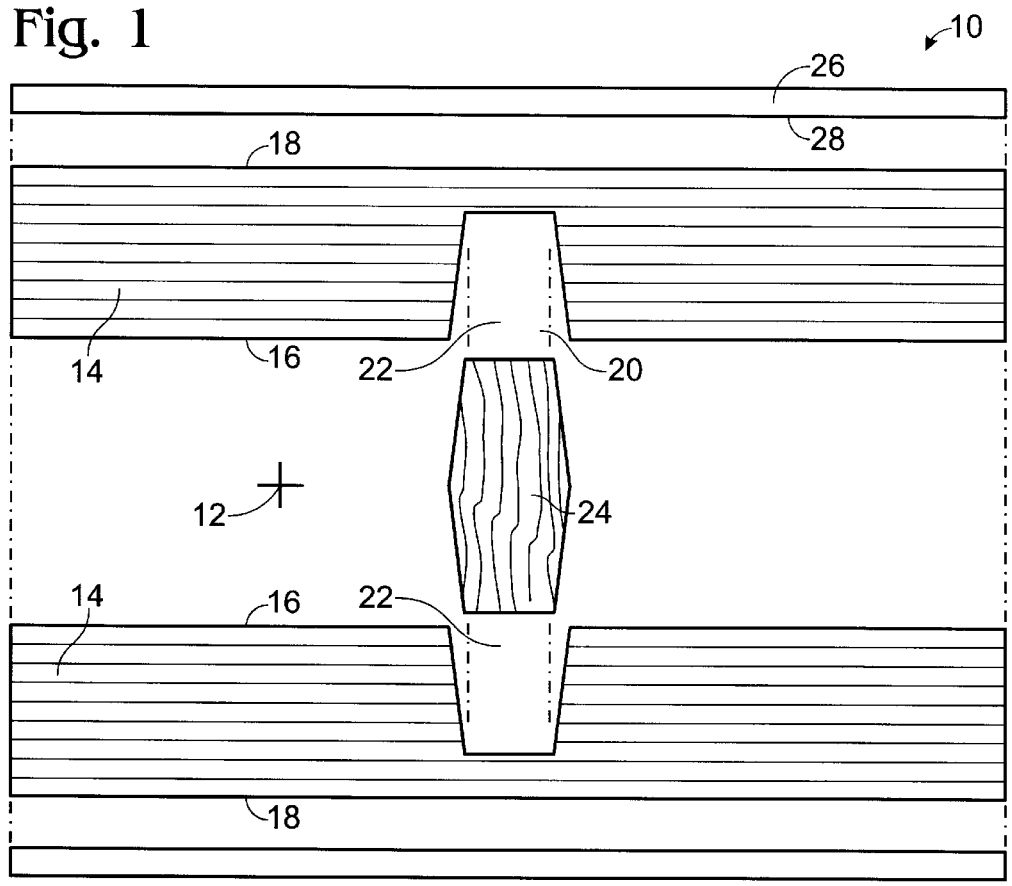
FIG. 1 is an exploded side view of a hybrid wood material constructed in accordance with the invention.

Referring now to FIG. 1, hybrid wood material 10, with longitudinal axis 12, is typically constructed by laminating several components. These components include a pair of composite wood products, such as LVL members 14, each with an inner contact surface 16 and an outer face 18. A furrow 20 is formed in contact surface 16 and extends substantially parallel to longitudinal axis 12. Furrow 20 from each LVL member 14 is configured to create a common key-receiving region 22 when LVL members 14 are joined at contact surfaces 16 with the furrows 20 aligned. A separate wood component, key 24, is provided to substantially fill key-receiving region 22. Veneer 26 may be affixed at an inner veneer face 28 to outer face of LVL member 14. The relative dimensions of hybrid wood product 10, including length, overall width, key width, overall thickness, and key thickness may be modified to suit a particular purpose.

The composite wood product may be any composite or synthetic material capable of being laminated to wood. Suitable composite materials include plywood, particle board, medium density fibreboard, oriented strand board, Bioboard, hemp board, and Glulam. A preferred material is LVL, such as the multi-ply material shown in the Figures. In a preferred embodiment, the LVL wood fibers are oriented substantially parallel to the longitudinal axis of the hybrid wood material.

The furrow may be any recess or groove formed on one of the opposing faces of the composite wood product that can be combined with the opposing composite wood product to create a common compartment or key receiving region. The furrow may include planar walls, arcuate walls, or a combination of these geometries. Furthermore, the furrow may extend substantially parallel to the entire longitudinal axis of the composite wood product, along the entire or a subset of this axis, or at an oblique angle to the longitudinal axis.

The key may be any wood product capable of substantially occupying the key-receiving region and further capable of being milled or shaped to create a substantially void-free surface. Suitable materials include solid sawn, single-ply lumber, which may be a single board, or a series of solid sawn boards joined end-to-end by any suitable joint, such as a fingerjoint. Additionally, face-to-face or edge-to-edge laminated material may be suitable as the key if the dimensions of each layer are chosen to allow creation of a milled, void-free surface substantially from one layer of a multi-ply key as viewed in cross section.

The veneer may be any coating that substantially covers the outer surface of the composite wood product. Suitable materials include sheets of high quality wood or wood products. Alternatively, the veneer may be a synthetic material, such as a plastic resin. The veneer is an optional component of the hybrid wood product and may provide an unmilled outer surface in some embodiments.

Figure 2:
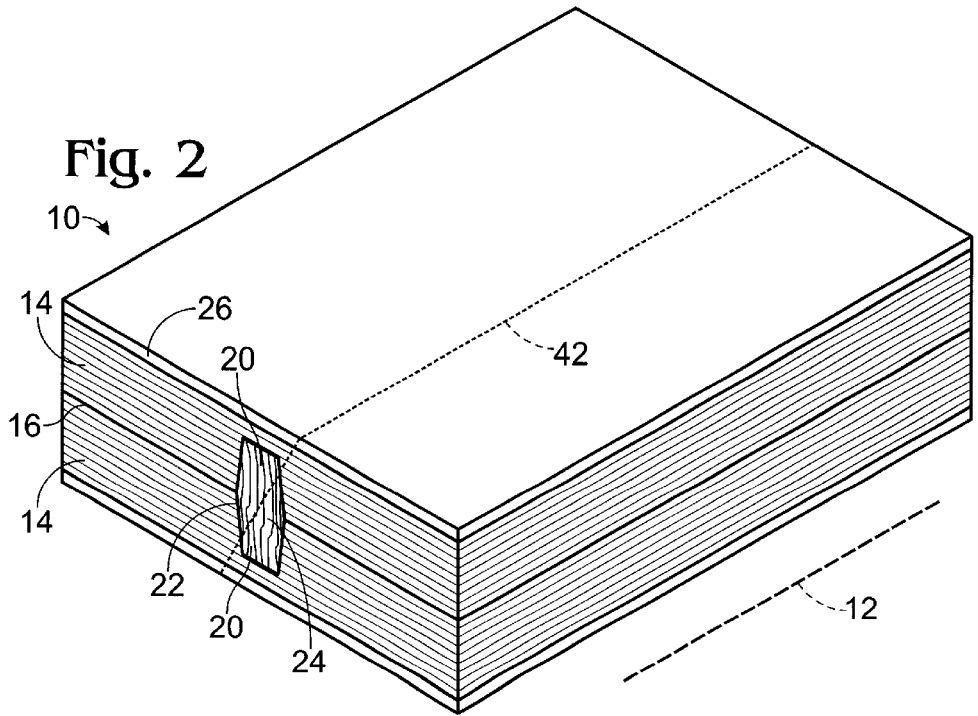
FIG. 2 is a perspective view of the hybrid wood material of FIG. 1.

Referring now to FIG. 2, assembled hybrid wood material 10 constructed in accordance with the invention is depicted. Contact surfaces 16 of LVL members 14 join to align furrows 20. Aligned furrows 20 produce key-receiving region 22, which has a hexagonal shape in this embodiment. Key 24 is configured to fit snugly into key-receiving region 22. In a preferred embodiment, a single-pass lamination step, using any appropriate wood glue or resin, may be used to unite the contacting surfaces of LVL members 14, key 24, and veneer 26. In other embodiments, a plurality of lamination steps are used, for example, in a first step a key is laminated to composite wood products and the veneer adhered in a subsequent step. In another example, the key is adhered to a first composite wood product and then joined with a second composite wood product in a subsequent step. As stated above, optional veneer coatings may be added to composite wood products at any point in the process.

After curing, hybrid wood material 10 is bisected into two products along cutting plane 42. As indicated in FIG. 2, cutting plane 42 will generally extend through all layers including key 24, at an angle. The angle defined by cutting plane 42 relative to contact surface 16 will be determined by the desired shape of the final product. Any suitable angle for cutting plane 42 may be chosen, including a cutting plane substantially orthogonal to contact surface 16. Furthermore, multiple cutting planes through the key may be selected and combined to create products with the desired geometry.

Figure 3:
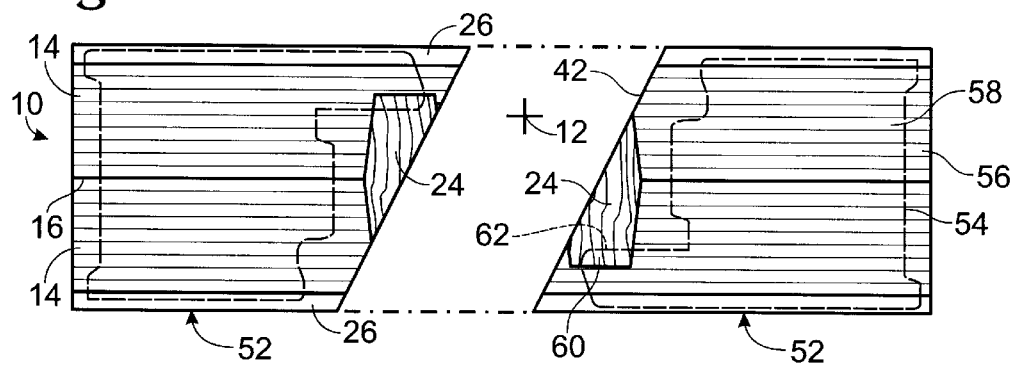
FIG. 3 is a side view of the embodiment of FIGS. 1 and 2 cut to produce two hybrid wood segments, with prospective milling contours indicated.

Referring now to FIG. 3, separating the hybrid wood material along cutting plane 42 creates two hybrid wood segments 52. Subsequent shaping of hybrid wood segments 52 to achieve a desired final geometry is achieved using a milling process along a milled contour 54 generally parallel to longitudinal axis 12. Milling hybrid wood segment 52 along milled contour 54 removes excluded hybrid 56 to product hybrid wood product 58. The milled contour 54 of FIG. 3 is intended to be illustrative only. Any milled contour may be created in a hybrid wood product of the appropriate dimensions to achieve a desired shape and size. In some embodiments the milling will not remove substantial amounts of hybrid wood segment 52, but instead will serve to smooth the surfaces created along cutting plane 42 by a process such as sanding.

A critical aspect of milled contour 54 is inclusion of a portion or all of key 24 in hybrid wood product 58. The region of key 24 that remains after milling of hybrid wood product 52 is a residual key 60. Residual key 60 provides avoid-free surface 62 for contact with a surface from another component or structure. Although void-free surface 62 is depicted in FIG. 3 as substantially parallel to contact surface 16, this is for exemplary purposes only. In general, residual key 60 and void-free surface 62 may be configured with any geometry to provide a joining surface for the desired purpose. For example, a void-free surface may be substantially perpendicular to contact surface 16, or may be positioned at an oblique angle relative to contact surface 16. Furthermore, although void-free surface 62 is depicted as a planar surface, some applications may require an arcuate or more complex surface to provide a complementary void-free surface for joining to another structure such as glass.

Figure 4:
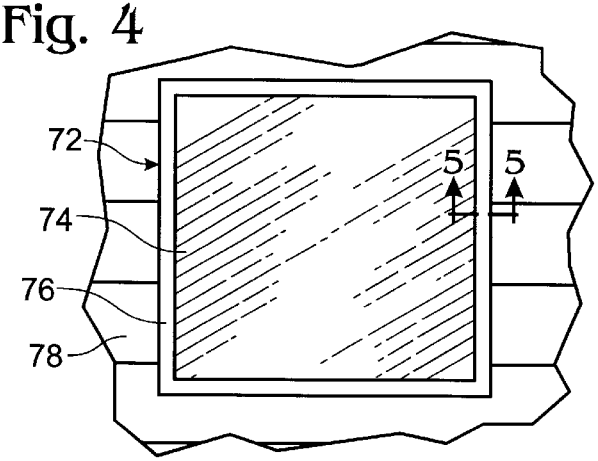
FIG. 4 is an exterior side view of a window frame contained in a building wall, with the frame including hybrid wood products constructed in accordance with the invention.
Figure 5:
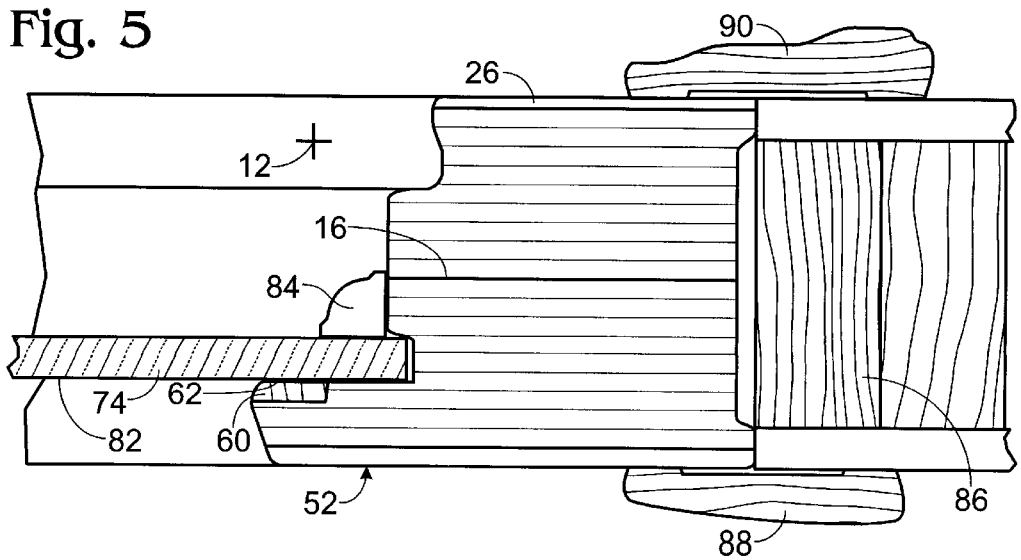
FIG. 5 is a cross-sectional view of the window frame of FIG. 4, viewed generally along line 5—5.

FIG. 4 provides an example of how hybrid wood product 58 produced in accordance with the invention may be used in a window 72. A glass pane 74 is shown supported by a frame 76 disposed within a wall 78 of a building. In FIG. 5, the components of the junction between glass pane 74 and frame 76 are illustrated in cross-section when viewed generally along line 5—5 of FIG. 4. Hybrid wood product 58 contributes void-free surface 62 to contact the perimeter of exterior surface 82 of glass pane 74. The contact between these two surfaces is sufficiently flawless to create a weather-resistant seal, capable of limiting air and water movement between the exterior and interior of the window.

In this example, support molding 84 contacts glass pane 74 on its inner surface and provides support to the glass pane through attachment to hybrid wood product 58. Frame component 86 provides a structural support from hybrid wood product 58, with the junction masked by exterior molding 88 and interior molding 90. Therefore, hybrid wood product 58 serves a multi-purpose junctional role in the window frame.

Although the invention has been disclosed in its preferred forms, the specific embodiments thereof as disclosed and illustrated herein are not to be considered in a limiting sense, because numerous variations are possible. Applicants regard the subject matter of their invention to include all novel and non-obvious combinations and subcombinations of the various elements, features, functions, and/or properties disclosed herein.

I claim:

1. A method of making a hybrid wood product, the method comprising providing first and second pieces of composite wood material, each piece having a contact surface and at least one of the pieces including a furrow in the contact surface, where the pieces are configured to be stacked together so that the contact surfaces touch and the furrow or furrows create a key-receiving region, providing a key configured to fit within the key-receiving region, adhering the key and the first and second pieces of composite wood material together so that the contact surfaces touch, the furrow or furrows create a key receiving region, and a key occupies the key-receiving region, cutting the first and second pieces of hybrid wood material and the key to produce at least two hybrid wood segments, and milling each hybrid wood segment to create a residual key with a substantially void-free surface.

2. The method of claim 1, wherein the composite wood material is laminated veneer lumber.

3. The composite wood material is selected from the group consisting of glulam, fibre board, plywood, bioboard, hempboard, and particle board.

4. The method of claim 1, wherein transverse sections through the key reveal a single piece of wood.

5. The method of claim 1, wherein the residual key includes a substantially planar region.

6. The method of claim 5, wherein the planar region is substantially parallel to the contact surfaces.

7. The method of claim 5, wherein the planar surface is substantially perpendicular to the contact surfaces.

8. The method of claim 1, further comprising providing first and second veneer sheets, each sheet with a surface adapted for attachment to an outer face of the composite wood material, and adhering the surface of the veneer sheets to the composite wood material.

9. The method of claim 8, wherein the veneer sheets, the composite wood material and the key are adhered concomitantly.

10. The method of claim 1, wherein the composite wood materials are configured to create a plurality of key receiving regions, a key being provided for each key-receiving region, and at least one cut extends through each key.

11. The method of claim 10, wherein the key-receiving regions are substantially parallel.

12. A composite wood product generated by the method of claim 1.

13. A method of making a hybrid wood product, the method comprising providing a piece of composite wood material having a first surface, bonding a piece of solid-sawn wood on to the first surface, cutting the solid-sawn wood to create a substantially void-free contact surface, and creating a substantially sealed interface between the contact surface of the solid-sawn wood and a surface on another structural piece of material.

14. The method of claim 13, wherein the structural piece of material comprises a transparent window expanse.

15. The method of claim 13, further comprising milling a furrow in the composite wood material, and providing the first surface in the furrow.

16. The method of claim 13, wherein the providing step includes the step of providing a second piece of composite wood material, each piece of composite wood material having at least one surface bonded to the piece of solid-sawn wood.

17. The method of claim 16, further comprising cutting a furrow in each piece of composite wood material.

18. The method of claim 17, further comprising bonding the two pieces of composite wood material together with the piece of solid-sawn wood contained in the furrows.

19. The method of claim 18, further comprising cutting diagonally the pieces of composite wood material and the piece of solid-sawn wood to create two substantially identical intermediate composite pieces.

20. The method of claim 19, further comprising removing a portion of the solid-sawn wood from each intermediate composite piece so that a remaining void free contact surface is configured for contacting a transparent window expanse.

* * * * *